United States Patent [19]

Kanda et al.

[11] Patent Number: 4,810,786

[45] Date of Patent: Mar. 7, 1989

[54] STABILIZATION OF XANTHAN GUM IN AQUEOUS SOLUTION

[75] Inventors: Shoichi Kanda; Zengiro Kawamura, both of Kanagawa, Japan

[73] Assignee: Nitto Chemical Industry Co., Ltd., Tokyo, Japan

[21] Appl. No.: 849,337

[22] Filed: Apr. 8, 1986

[30] Foreign Application Priority Data

Apr. 8, 1985 [JP] Japan .................................. 60-72713
May 31, 1985 [JP] Japan ................................ 60-116508

[51] Int. Cl.$^4$ ............................................. C08B 37/00
[52] U.S. Cl. ................................. 536/114; 252/402; 252/8.513
[58] Field of Search ......................................... 536/114

[56] References Cited

U.S. PATENT DOCUMENTS 4,607,099 8/1986 Kanda et al. ..................... 536/114

Primary Examiner—Johnnie R. Brown
Assistant Examiner—Elli Peselev
Attorney, Agent, or Firm—Sughrue, Mion, Zinn, Macpeak and Seas

[57] ABSTRACT

A method of stabilizing an aqueous solution of xanthan gum is disclosed, comprising incorporating at least one stabilizing agent selected from thiol derivatives of heterocyclic compounds in an aqueous solution of xanthan gum.

4 Claims, No Drawings

STABILIZATION OF XANTHAN GUM IN AQUEOUS SOLUTION

FIELD OF THE INVENTION

This invention relates to a method of stabilizing xanthan gum, produced in a liquid nutrient medium by the action of a microorganism belonging to the genus Xanthomonas, in an aqueous solution.

BACKGROUND OF THE INVENTION

Xanthan gum is used widely in a number of industrial fields, such as oil-well drilling, the ceramic industry, the paint industry, and the like. However, its performance characteristics frequently deteriorate even during storage at room temperature; such tendency becomes significant at higher temperatures and, in extremely cases, the use thereof for the intended purpose becomes impossible.

For example, in the case of petroleum recovery from an underground oil stratum by introducing under pressure an aqueous solution of xanthan gum, the oil stratum temperature generally reaches about 40° to 100° C. and the aqueous xanthan gum solution injected stays in the underground oil stratum from the injection well to the production well for a long period of time, for example, several months to scores of months. Therefore, guarantees of the quality of xanthan gum during such periods have been demanded.

Xanthan gum is also widely used as a modifier for the mud-laden fluid for mud drilling in searching for petroleum. However, with the recent increase in the depth of drilling, the stratum temperature reaches 90° C. or even higher so that xanthan gum is decomposed and loses its function as a modifier for the mud-laden fluid, possibly leading to serious difficulties in drilling operations. For xanthan gum to fully achieve the intended purpose of its use, it is necessary to minimize the change of quality of xanthan gum in the above temperature range over the course of time.

SUMMARY OF THE INVENTION

The present inventors have conducted extensive and intensive studies on the stabilization of xanthan gum in aqueous solution and on additives for such stabilization and, as a result, found that decomposition of the xanthan gum can be substantially inhibited by incorporating a thiol derivative of a heterocyclic compound. This finding has now led to the present invention.

Thus, the present invention relates to a method of stabilizing xanthan gum in an aqueous solution comprising incorporating, in an aqueous solution of xanthan gum, at least one member selected from the group consisting of the thiol derivatives of heterocyclic compounds hereinafter described.

DETAILED DESCRIPTION OF THE INVENTION

The thiol derivatives of heterocyclic compounds which can be used for stabilization of xanthan gum are 2-mercaptobenzothiazole and its derivatives represented by the formula (I); 2-thioimidazolidone represented by the formula (II); 2-mercaptothiazoline represented by the formula (III); benzoxazole-2-thiol represented by the formula (IV); N-pyridineoxide-2-thiol represented by the formula (V); 1,3,4-thiadiazole-2,5-dithiol represented by the formula (VI); and 4-ketothiazolidine-2-thiol represented by the formula (VII):

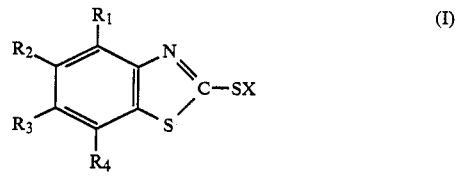

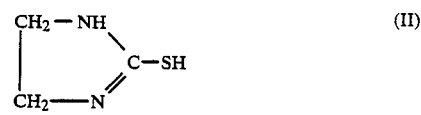

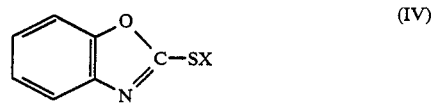

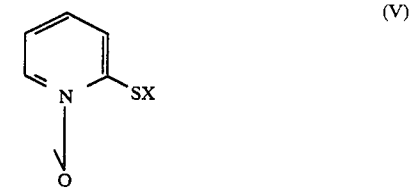

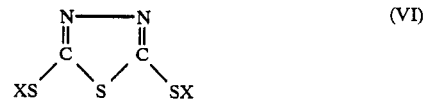

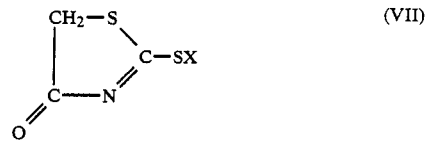

wherein $R_1$, $R_2$, $R_3$ and $R_4$ each represents a hydrogen atom, a methyl group or an ethyl group; and X represents a hydrogen atom, an alkali metal or ammonium.

It is known that thiourea, 2-mercaptobenzothiazole and derivatives thereof are effective to stabilize aqueous solutions of acrylamide polymers as described, e.g., in U.S. Pat. Nos. 3,235,523 and Japanese Patent Publication Nos. 47414/83 and 48583/83. On the other hand, it is also known that thiourea is substantially ineffective in the stabilization of aqueous xanthan gum solutions. Thus, it is well known in the art that a certain stabilizing agent which is effective in stabilizing some substances is not always effective in stabilizing other substances. This is presumably because the mechanisms of stabilization differ in various ways depending on the combination of the stabilizing agent and the substance to be stabilized.

Under these circumstances, the present invention has been completed based on the finding that the particular combination of the above-described compounds and xanthan gum is very effective in the stabilization of aqueous solutions of xanthan gum.

The terminology "xanthan gum" as used herein means a substance produced in a liquid nutrient medium by the action of a microorganism belonging to the genus Xanthomonas. Such substance is commercially available, for example, from Kelco, USA under the trade names "Kelzan" and "Xanflood" and from Pfizer, USA under the trade names "Flocon" and "Pfizer Xanthan Biopolymer". The aqueous xanthan gum solution to be stabilized in accordance with the present invention preferably has a concentration of from about 0.0001 to 10% by weight, and it is particularly preferred that the invention be applied to aqueous xanthan gum solutions having concentrations ranging from about 0.0001 to 5% by weight.

The above-described stabilizing agents may be used either alone or in combinations of two or more thereof. Further, they may also be used in combination with other known stabilizing agents. The stabilizing agents in accordance with the present invention are used in an amount of from 0.05 to 20 parts by weight per 100 parts by weight of xanthan gum. Amounts less than 0.05 part by weight produce only poor stabilizing effects, whereas addition in amounts exceeding 20 parts by weight produces little difference in the stabilzing effect as compared with the level obtained by addition of 20 parts by weight, and hence is unfavorable from an economical viewpoint.

In carrying out the present invention, the stabilizing agent can be incorporated in the aqueous xanthan gum solutions, for example, (1) by mixing the stabilizing agent in powder form with xanthan gum in powder form using a mixer or a blender, (2) by admixing the stabilizing agent in the form of powder or aqueous solution with a xanthan gum-containing fermentation broth, or (3) by adding the stabilizing agent in the form of powder or aqueous solution to an aqueous solution of xanthan gum with stirring.

With aqueous xanthan gum solutions stabilized in accordance with the present invention, the stabilizing effect is manifested not only at room temperature but also at a temperature as high as 90° C. The stabilizing effect at high temperatures is particularly useful.

The kind of water to be used in preparing aqueous xanthan gum solutions may vary depending on the intended use of said solutions but is not critical. Thus, the water can appropriately be selected from among seawater, ground water, river water, city water, industrial water, etc.

The following examples are further illustrative of the effect of this invention.

EXAMPLE 1

In 1,000 g of deionized water was dissolved 5.0 g of Kelzan (trade name of xanthan gum produced by Kelco, USA) to prepare a 0.5% aqueous xanthan gum solution. The solution had a viscosity of 2,410 cp (Brookfield viscometer No. 2 rotor, 6 rpm, 25° C.).

The above xanthan gum was dissolved in a 3% aqueous sodium chloride solution to make a 0.12% aqueous xanthan gum solution. After the solution was adjusted to a pH of 9, its viscosity (initial viscosity, $A_o$) was measured. Then, a specified amount (see Table 1) of a sodium salt of 2-mercaptobenzothiazole (MBT-Na) was added thereto, and the resulting solution was heated in a glass ampule at 120° C. for 3 or 20 hours, followed by measuring the viscosity ($A_t$). The change in quality of the solution with time was evaluated by obtaining a percent viscosity loss ($A_t/A_o \times 100$). The results thus obtained are shown in Table 1 below.

TABLE 1

| Amount of MBT-Na Added (%)* | Viscosity Loss (%) | |
|---|---|---|
| | After 3 Hours | After 20 Hours |
| 0 | 25.6 | 88.2 |
| 0.5 | 8.9 | 72.3 |
| 2.0 | 3.9 | 34.6 |
| 5.0 | 3.0 | 21.9 |
| 7.5 | 2.7 | 18.6 |
| 15.0 | 2.0 | 11.7 |

Note:
*% by weight based on the polymer (hereinafter the same)

EXAMPLE 2

The procedure of Example 1 was repeated except that a sodium salt of 2-mercaptobenzothiazole having its benzene ring substituted with a methyl group (MMBT-Na) was used in place of MBT-Na used in Example 1. The results obtained are shown in Table 2 below.

TABLE 2

| Amount of MMBT-Na Added (%) | Viscosity Loss (%) | |
|---|---|---|
| | After 3 Hours | After 20 Hours |
| 0 | 26.3 | 88.0 |
| 0.5 | 9.6 | 73.5 |
| 2.0 | 4.4 | 33.9 |
| 5.0 | 3.6 | 22.0 |
| 7.5 | 2.9 | 17.4 |
| 15.0 | 2.4 | 10.9 |

EXAMPLE 3

A 0.1% aqueous solution of xanthan gum was prepared by dissolving the same xanthan gum species as used in Example 1 in tap water, adjusted to a pH of 9.0 and, following addition of MBT-Na as in Example 1, subjected to heat treatment at 90° C. for 3 or 20 hours. Thereafter, the percent viscosity loss was obtained in the same manner as in Example 1. The results obtained are shown in Table 3 below.

TABLE 3

| Amount of MBT-Na Added (%) | Viscosity Loss (%) | |
|---|---|---|
| | After 3 Hours | After 20 Hours |
| 0 | 46.7 | 89.6 |
| 0.5 | 13.9 | 75.6 |
| 2.0 | 8.0 | 59.0 |
| 5.0 | 4.5 | 38.3 |
| 7.5 | 3.6 | 20.6 |
| 15.0 | 2.9 | 15.7 |

EXAMPLE 4

The procedure of Example 1 was repeated except that 2-mercaptobenzothiazole (MBT) was used in place of MBT-Na. The results obtained are shown in Table 4.

TABLE 4

| Amount of MBT Added (%) | Viscosity Loss (%) | |
|---|---|---|
| | After 3 Hours | After 20 Hours |
| 0 | 26.0 | 89.2 |
| 0.5 | 10.0 | 73.1 |
| 2.0 | 3.8 | 34.8 |
| 7.5 | 2.9 | 23.0 |

EXAMPLE 5

The procedure of Example 1 was repeated except for changing the concentration of the xanthan gum aqueous solution to 0.1%, using 2-thioimidazolidone in place of MBT-Na and changing the heating temperature to 110° C. The results obtained are shown in Table 5 below.

TABLE 5

| Amount of 2-Thioimida- | Viscosity Loss (%) | |
| zolidone Added (%) | After 3 Hours | After 20 Hours |
| --- | --- | --- |
| 0 | 19.3 | 81.5 |
| 0.5 | 6.6 | 69.0 |
| 2.0 | 2.1 | 25.3 |
| 5.0 | 1.8 | 14.6 |
| 7.5 | 1.0 | 11.2 |
| 15.0 | 0.9 | 7.0 |

EXAMPLE 6

The procedure of Example 1 was repeated except for using a 3% sodium chloride-0.3% calcium chloride aqueous solution in place of the 3% sodium chloride aqueous solution, changing the concentration of the xanthan gum aqueous solution to 0.1% and using 2-mercaptothiazoline in place of MBT-Na. The results thus obtained are shown in Table 6 below.

TABLE 6

| Amount of 2-Mercapto- | Viscosity Loss (%) | |
| thiazoline Added (%) | After 3 Hours | After 20 Hours |
| --- | --- | --- |
| 0 | 25.4 | 91.6 |
| 0.5 | 8.4 | 80.0 |
| 2.0 | 3.0 | 36.3 |
| 5.0 | 2.1 | 21.3 |
| 7.5 | 1.8 | 16.6 |
| 15.0 | 1.3 | 13.3 |

EXAMPLE 7

The procedure of Example 1 was repeated except for using a 3% sodium chloride-0.3% calcium chloride aqueous solution in place of the 3% sodium chloride aqueous solution, changing the concentration of the xanthan gum aqueous solution to 0.08%, using benzoxazole-2-thiol in place of MBT-Na and changing the heating temperature to 110° C. The results obtained are shown in Table 7.

TABLE 7

| Amount of Benzoxazole- | Viscosity Loss (%) | |
| 2-Thiol Added (%) | After 3 Hours | After 20 Hours |
| --- | --- | --- |
| 0 | 27.6 | 92.0 |
| 0.5 | 7.8 | 68.3 |
| 2.0 | 3.0 | 26.1 |
| 5.0 | 1.9 | 14.1 |
| 7.5 | 1.0 | 12.2 |
| 15.0 | 1.0 | 9.4 |

EXAMPLE 8

The procedure of Example 1 was repeated except for using tap water in place of the 3% sodium chloride aqueous solution, using N-pyridineoxide-2-thiol in place of MBT-Na and changing the heating temperature to 100° C. The results thus obtained are shown in Table 8 below.

TABLE 8

| Amount of N—Pyridine- | Viscosity Loss (%) | |
| oxide-2-Thiol Added (%) | After 3 Hours | After 20 Hours |
| --- | --- | --- |
| 0 | 44.4 | 91.3 |
| 0.5 | 13.6 | 74.6 |
| 2.0 | 8.8 | 59.1 |
| 5.0 | 6.1 | 33.6 |
| 7.5 | 5.8 | 20.9 |
| 15.0 | 4.5 | 14.5 |

EXAMPLE 9

The procedure of Example 1 was repeated except for using 1,3,4-thiadiazole-2,5-dithiol in place of MBT-Na and changing the heating temperature to 115° C. The results obtained are shown in Table 9.

TABLE 9

| Amount of 1,3,4-Thiadiazole-,2,5- | Viscosity Loss (%) | |
| Dithiol Added (%) | After 3 Hours | After 20 Hours |
| --- | --- | --- |
| 0 | 21.6 | 88.3 |
| 0.5 | 13.4 | 75.5 |
| 2.0 | 9.3 | 31.4 |
| 5.0 | 7.4 | 18.1 |
| 7.5 | 5.0 | 15.1 |
| 15.0 | 4.1 | 13.9 |

EXAMPLE 10

The procedure of Example 1 was repeated excpet for using tap water in place of the 3% sodium chloride aqueous solution, changing the concentration of the xanthan gum aqueous solution to 0.8%, using 4-ketothiazolidine-2-thiol in place of MBT-Na and changing the heating temperature to 105° C. The results obtained are shown in Table 10.

TABLE 10

| Amount of 4-Ketothia- | Viscosity Loss (%) | |
| zolidine-2-Thiol Added (%) | After 3 Hours | After 20 Hours |
| --- | --- | --- |
| 0 | 41.6 | 90.5 |
| 0.5 | 21.1 | 72.1 |
| 2.0 | 10.6 | 54.1 |
| 5.0 | 7.3 | 30.6 |
| 7.5 | 6.0 | 19.8 |
| 15.0 | 5.5 | 15.7 |

While the invention has been described in detail and with reference to specific embodiments thereof, it will be apparent to one skilled in the art that various changes and modifications can be made therein without departing from the spirit and scope thereof.

What is claimed is:

1. A process of stabilizing an aqueous solution of xanthan gum which comprises incorporating at least one stabilizing agent selected from the group consisting of (A) 2-mercaptobenzothiazole and derivatives thereof represented by the formula (I):

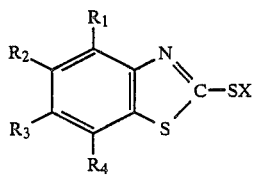
(I)

wherein $R_1$, $R_2$, $R_3$ and $R_4$ each represents a hydrogen atom, a methyl group or an ethyl group; and X represents a hydrogen atom, an alkali metal or ammonium, (B) 2-thioimidazolidone represented by the formula (II):

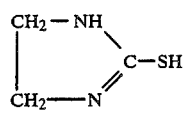
(II)

(C) 2-mercaptothiazoline represented by the formula (III):

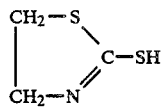
(III)

(D) benzoxazole-2-thiol and salts thereof represented by the formula (IV):

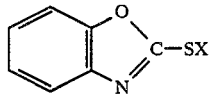
(IV)

wherein X is as defined above, (E) N-pyridineoxide-2-thiol and salts thereof represented by the formula (V):

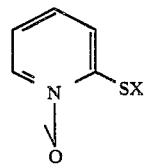
(V)

wherein X is as defined above, (F) 1,3,4-thiadiazole-2,5-dithiol and salts thereof represented by the formula (VI):

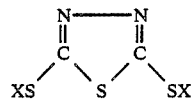
(VI)

wherein X is as defined above, and (G) 4-ketothiazolidine-2-thiol and salts thereof represented by the formula (VII):

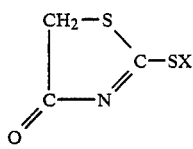
(VII)

wherein X is as defined above,
in an aqueous solution of xanthan gum.

2. A process as in claim 1, wherein the aqueous solution of xanthan gum has a xantham gum concentration of from about 0.0001 to 10% by weight.

3. A process as in claim 2, wherein the aqueous solution of xanthan gum has a xanthan gum concentration of from about 0.0001 to 5% by weight.

4. A process as in claim 1, wherein the stabilizing agent is used in an amount of from 0.05 to 20 parts by weight per 100 parts by weight of xanthan gum.

* * * * *